UNITED STATES PATENT OFFICE.

SAMUEL PEACOCK, OF PHILADELPHIA, PENNSYLVANIA, ASSIGNOR, BY MESNE ASSIGNMENTS, TO MARDEN, ORTH & HASTINGS CO. INC., OF NEW YORK, N. Y., A CORPORATION OF MAINE.

PROCESS OF MAKING MAGNESIUM COMPOUNDS FROM SILICATE MINERALS.

1,231,423.     Specification of Letters Patent.     Patented June 26, 1917.

No Drawing. Original application filed July 15, 1915, Serial No. 40,096. Divided and this application filed August 7, 1916. Serial No. 113,659.

*To all whom it may concern:*

Be it known that I, SAMUEL PEACOCK, a citizen of the United States, residing at Philadelphia, in the county of Philadelphia and State of Pennsylvania, have invented certain new and useful Improvements in Processes of Making Magnesium Compounds from Silicate Minerals; and I do hereby declare the following to be a full, clear, and exact description of the invention, such as will enable others skilled in the art to which it appertains to make and use the same.

This invention relates to a process of extracting magnesium compounds from minerals and has for its object to provide a method which will be more simple, less costly, and more efficient in operation than those heretofore proposed.

With these and other objects in view the invention consists in the novel steps and combinations of steps constituting my process, all as will be more fully hereinafter disclosed and particularly pointed out in the claims.

This application is a division of my copending application No. 40096, filed July 15, 1915, process of producing magnesium compounds.

In this application I produce the comparatively pure magnesium compounds by employing an alkali as follows:—The naturally occurring magnesia bearing mineral is finely divided and is added to an alkali solution, such as sodium hydrate, when the mixture is heated with or without pressure in a steam digester or otherwise. Or the mineral and the alkali may be thoroughly mixed in a dry state, and roasted in any suitable type of furnace. In the latter case an oxid of magnesium and a silicate of the alkali used will be formed. When the furnace method is used the product is treated with water, and in both cases the magnesium compound is separated from the silicate by filtration or otherwise.

The magnesium compounds thus produced may readily be converted into the oxid or into the sulfate or other salts by any suitable means.

In both processes the magnesium salt is recovered practically free from silica, although it may contain certain other basic impurities of the mineral. The magnesium compounds thus produced are especially useful for treatment with oxychlorids to produce substantially pure anhydrous magnesium chlorid. In this connection it is of great importance that said compounds be free from silica, for otherwise it would be difficult to obtain a substantially pure anhydrous chlorid from an impure magnesium salt.

It is obvious that those skilled in the art may vary the details of the process without departing from the spirit of the invention and therefore I do not wish to be limited to the above disclosure except as may be required by the claim.

What I claim is:—

The process of producing magnesium compounds from silicate minerals which consists in finely dividing a magnesium bearing silicate mineral digesting said mineral with an alkali metal hydrate to form an alkali metal silicate and a magnesium hydrate; and suitably separating the salts thus formed, substantially as described.

In testimony whereof I affix my signature, in presence of a witness.

SAMUEL PEACOCK.

Witness:
   T. A. WITHERSPOON.